June 16, 1931.  L. EMANUELI  1,809,927
MEANS FOR MAINTAINING OIL PRESSURE IN HIGH TENSION ELECTRIC CABLES
Original Filed Sept. 1, 1925
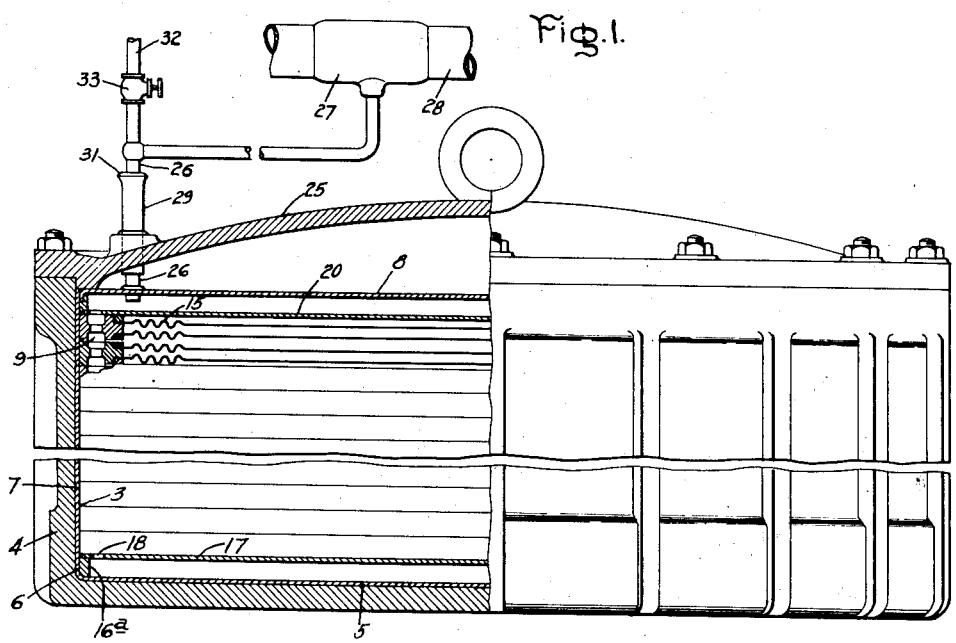
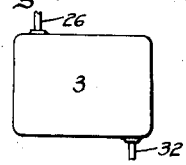
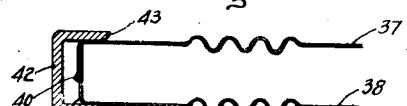
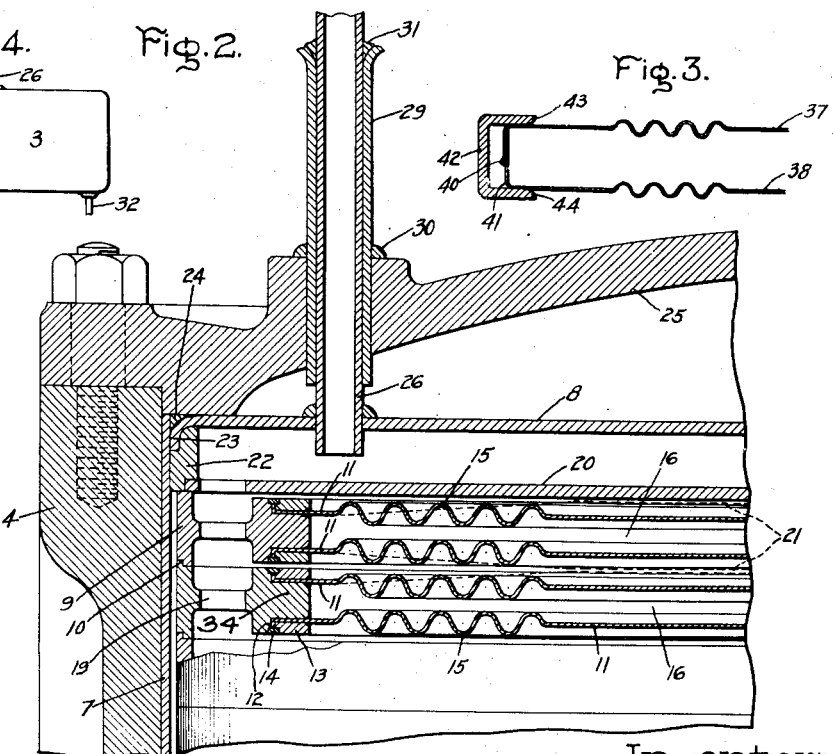
Inventor:
Luigi Emanueli,
by *Alexander S. Lunt*
His Attorney.

Patented June 16, 1931

1,809,927

UNITED STATES PATENT OFFICE

LUIGI EMANUELI, OF MILAN, ITALY, ASSIGNOR TO SOCIETA ITALIANA PIRELLI, OF MILAN, ITALY, A CORPORATION OF ITALY

MEANS FOR MAINTAINING OIL PRESSURE IN HIGH TENSION ELECTRIC CABLES

Original application filed September 1, 1925, Serial No. 53,930. Divided and this application filed September 19, 1927. Serial No. 220,334.

The present application is a division of my application, Serial No. 53,930, filed September 1, 1925.

Certain modern underground cables for high tension electric currents, comprise one or more conductors which are covered with paper or other factory made or wound insulation and an enclosing sheath. Either in the center of the conductor or between the factory wound insulation and the sheath are one or more passages which are filled with oil that permeates the insulation. In such a cable, it is essential to prevent the entrance of air even in small amounts inside of the sheath as it very greatly reduces the effective insulation and is also liable to cause burn-outs. If air is kept out of the sheath the paper insulation may be reduced by approximately one-half with the additional advantage that the cable may be made smaller in diameter. It is also essential to prevent the escape of oil from the sheath. To attain these desirable features it is necessary that the sheath be made air and oil tight, that the sheath be filled with oil, that the insulation be fully impregnated with oil, and that the oil be kept out of contact with the air. Another problem arises from the fact that in cables of the character indicated, changes of temperature due to the heating effect of the current flowing in the conductor and to climatic changes, or both, (which under extreme conditions may amount to as much as 70° centigrade) cause expansion and contraction of the oil with the result of forcing it out of the sheath as the temperature rises and producing a suction or vacuum effect therein as the temperature falls. In the latter case, unless there is a supply of oil instantly available voids will be formed within the sheath, which voids are commonly the places where failure of the insulation begins.

In the parent application of which this is a division, there are illustrated and described feeding and pressure reservoir arrangements for automatically taking care of the expansion and contraction of the oil and at the same time preventing access of air either to the interior of the cable sheath or to the insulating oil.

The present invention is directed to variable capacity reservoirs intended for oil-filled underground electric cables and specifically to that type in which a pressure is maintained which is or may be substantially above that of the surrounding atmosphere. The object of my invention is to provide a reservoir of improved construction for use with high tension cables and one in which the danger of failure to properly operate is reduced to a minimum.

For what I believe to be novel and my invention, attention is directed to the accompanying description and the claims appended thereto.

In the accompanying drawings, which are illustrative of my invention, Fig. 1 is a view partly in elevation and partly in section of a pressure reservoir; Fig. 2 is a sectional detail on an enlarged scale of a portion thereof; Fig. 3 is a sectional view of a somewhat simpler form of cell, and Fig. 4 shows an arrangement for getting rid of air in the container as it is being filled with oil.

Reservoirs of this character commonly have to be located under ground in manholes and the like and are subjected to moisture and dirt most if not all of the time and may even be flooded with water. From the very nature of the work they generally must be located in relatively inaccessible places. A device of this character must work year in and year out without failure and without special attention, for should a serious failure occur, it would result in burning out one or more of the cables and the loss of very large sums of money, to say nothing of the serious injury to the system as a whole and the loss to customers receiving current from the cable. Thus it will be seen that much depends upon what at first would seem to be a relatively simple device.

To meet the exacting requirements above indicated, an hermetically-sealed container is provided in which is located a plurality of relatively small metallic cells each of which is complete in itself. Each cell has its own relatively small chamber which is hermetically sealed and contains an elastic fluid medium such as air or other gas and generally under a pressure which may be that of the atmosphere or greater if desired. The chamber in the container is filled with oil in which the cells are submerged and is connected to the interior of the cable sheath by a suitable conduit so that as the oil in the cable expands it is delivered to the reservoir and as the cable cools is returned to it. The walls of the cells are made elastic so that they will yield inwardly when subjected to external pressure, the tendency to yield being, of course, opposed by the elastic medium within the chamber of each cell, said walls moving outwardly when the pressure of the surrounding liquid falls. Since the container or casing is sealed airtight and since each cell is similarly sealed and the container piped directly to the interior of the cable, it follows that no air can enter the system nor can any of the oil escape. Also, that since the cells are compressible, they will compress or expand to accommodate varying quantities of oil, and since each cell will expand as the oil pressure drops they will force oil back into the cable and prevent the formation of voids which are a source of real danger to the effective insulation of the electric conductor.

Inasmuch as each cell is a unit by itself and is located in a sealed container, the cells need not be specially supported but can rest on one another. It is generally advisable, however, to so stack them in the container that they are held against sidewise as well as axial movements. Prior to introducing oil into the container, (it being assumed that the cable has been filled), it is necessary to get rid of the air and other gases therein. In practice a number of these reservoirs are connected to the cable sheath at suitable intervals and act to feed oil in parallel thereto or receive it in like manner therefrom as the pressure in the sheath rises.

3 indicates a hermetically-sealed container which, if not capable of withstanding the pressures to which it may be subjected, has an outside protective casing 4 which is commonly made of cast iron to ensure the necessary strength and to resist corrosion. As an illustration, but not as a limitation of my invention, the pressure of oil within the container may be as much as thirty pounds. The container may be made of copper, brass or other metal which is easily soldered or welded for the purpose of ensuring tight joints. The container comprises a flat bottom wall 5 having an upturned peripheral edge 6, a cylindrical portion 7 and a cover 8, all of these various parts being united by brazing or soldering, the cover of course, being applied after the inner parts are assembled in place.

Inside the container is a plurality of elements or cells each of which is complete in itself. In the form of the invention illustrated in Figs. 1 and 2, each cell comprises an outer ring 9, Fig. 2, which is rabbeted or shouldered at 10 to receive a corresponding part of the adjacent ring and thus serve to center or hold the cells against relative lateral displacement. The rings have internal shoulders 34 to receive the peripheral edges of a pair of imperforate diaphragms 11 which form two walls of the cell, in this case the top and bottom. As illustrated, the annular shoulders 34 form the rims for the cellular means and these are in turn supported by the rings 9. The rings are thicker than the shoulders and rest on one another so that the said means are held in fixed spaced relation with suitable clearance spaces between adjacent walls to permit of predetermined limited movements. The feature of combining the rim and ring in one piece is of substantial importance, because it simplifies the construction as a whole, reduces the cost of manufacture, and facilitates assembly thereof. The outer edges of the diaphragms are flanged at 12 and are held in place partly by the flanges and rings 13 and partly by means of soldered joints 14 which joints are, of course, annular. To render the diaphragms more flexible they may be concentrically corrugated for a portion of their surface as indicated at 15. In each cell thus formed is a chamber 16 in which is confined a body of elastic fluid at whatever pressure is required to meet the requirements of the service for which the reservoir is intended. Fluid under the desired pressure is admitted to the cell during the manufacturing operation, and the point of admission is subsequently sealed in any suitable manner. Situated in the bottom of the container is a ring $16^a$, Fig. 1, which acts as a bottom support for the various cells and at the same time provides a space for oil. Between the top of the ring and the bottom of the adjacent cell is a flat plate 17 having one or more holes 18, usually a number to permit of free flowing of the oil, which register with other holes or openings 19 in the supporting rings of the cells to afford a free circulation of the oil in the container. It will be seen that the openings 19 are in free communication with the transverse spaces defined by the walls of two adjacent cells. After the cells or elements are completed they are assembled or stacked in the container one above another, after which the top plate 20 is applied and seated on the ring portion of the top cell. The plate limits the upward movement of the top wall of the upper cell when the pressure within the cell is substantially greater than the external oil pressure. The plate 17 performs the same office for the lower wall of the bottom cell.

The outward movements of the walls of the intermediate cells are limited to a point where they contact one with the other as shown by the dotted lines 21 in Fig. 2. This is a particularly advantageous arrangement as it avoids the necessity of spacers or other distance pieces to prevent bursting.

Located above the top plate is a ring 22 which is shouldered on its underside to center the plate 20 and is itself in contact with the vertical wall of the container. At the top the ring is shouldered to receive the downwardly-turned flange 23 of the cover 8 and the former is secured in place by a soldered or welded joint 24. The oil in the container fills all the space within its chamber not occupied by the cells and associated parts. The cubical contents of the container chamber can, of course, be made anything that is desired for the service intended, and the number and size of the cells made accordingly.

The surrounding casing or shell for the container is closed by the heavy cover 25 which is securely held in place by bolts and nuts. 26 indicates a tube for conveying oil to and from the interior of the reservoir. One end of said tube passes through the top wall of the container and is soldered or otherwise united therewith to make a tight joint. The other end of the tube is connected to the interior of the imperforate metallic sheath or covering 27 of the high tension current-carrying cable 28, which cable may be of any suitable construction and may have one or more conductors, the details of which are not material to an understanding of the present invention. As it would be difficult to seal the tube to the cover of the casing after the parts are assembled, and because it would be difficult to open and renew such joints, if necessary, a sleeve 29 is provided which is welded or soldered at 30 to the cover. The upper end of the sleeve is flared and it and the tube 26 are united by a wiped soldered joint or other means as indicated at 31.

On account of the fact that air must be excluded from the cable, it is necessary to get rid of the air in the chamber in the container before it is put in communication with the cable. This may be done in any convenient or suitable way. For example, but not as a limitation of my invention, the tube 26 may be provided with an extension 32 beyond the point of connection to the cable and its outer end provided with a suitable fitting to receive the suction pipe of a vacuum pump. Between this point and the connection leading to the cable is a valve 33 of suitable construction which may be opened when the pump is in use. When the valve is shut the pump connection may be removed and an oil supply pipe connected, after which the reservoir and tube or connection leading to the cable are filled with suitable oil by opening the valve. Subsequently, the valve will be closed and the parts suitably sealed. Another way to rid the container of air is to admit oil at the lowest part of the container by conduit 32 and permit the air to escape at the highest point by conduit 26 as indicated in Fig. 4, after which the connection is made between the container and cable sheath and either one or the other of the conduits sealed. The reservoir may be located above, below or at one side of the cable; in other words, at any convenient point and as the oil expands or contracts, will be automatically fed into the reservoir or delivered therefrom under sufficient pressure to force the oil back into the cable and prevent the formation of voids or pockets. By varying the pressure of the elastic fluid confined within each cell this pressure may be made large or small as desired. The fact that all parts of the reservoir are hermetically sealed will prevent the admission of air at any point and also the escape of oil.

Since the cells are enclosed in a hermetically-sealed container, if one of them is ruptured such fact cannot be readily determined and for that reason the cells should be carefully made and strong enough to withstand greater pressures than they would be subjected to in service. It is preferable to make the cells relatively small and numerous so that should one of them fail for any cause, the effect on the cable would be negligible.

In Fig. 3 is shown a simpler form of cell. It comprises two members 37 and 38, both of which have peripheral flanges arranged in telescopic relation so that one will fit inside the other. One of the flanges is flared outwardly at 40 to facilitate the union of the two members by solder or other means. The members are also concentrically corrugated to increase their flexibility. The region where each member merges into its peripheral flange is well rounded at 41 so that the strains due to bending of the members will not cause cracking of the metal. Each cell may be located in a two-part ring 42 which is slipped into place after the cell is completed. The ring has top and bottom flanges 43 which cover a limited portion of the cell and have well rounded edges 44 to prevent injury to the top and bottom walls of the cell as they move outwardly. The cells and their rings are so supported in the container that the rings rest on one another after the manner indicated in the other figures.

The walls of the cells are purposely made thin so as to be as flexible as possible consistent with the service to be performed and hence offer only limited resistance to movement. The fact that the walls of the cells mutually support each other is of great importance, especially since the area of contact increases with increased pressure differences. Assuming the container to be evacuated and the elastic fluid within the cells to be at atmospheric pressure there will be a force of approximately fifteen pounds per square inch tending to burst the same, and in this connection it must be remembered that the walls of these cells prevent substantial surface areas. This action is resisted by the top and bottom plates and by the walls of one cell contacting with those of adjacent cells.

The area of one wall in contact with another gradually increases, of course, as the pressure within the container falls.

With a vacuum inside the container, the pressure of the atmosphere would tend to collapse it; but this action is balanced or practically so by the cells themselves which contain an elastic medium, the pressure of which is at least as great as that of the atmosphere. On the other hand, as the pressure of the oil in the container increases due to the heating thereof by the action of the electric current flowing in the high tension conductor, the walls of each of the several cells will be forced inwardly until they contact. The area of contact increases as the pressure within the container rises and the movements of the walls and the changes of contact area are facilitated by the corrugations therein. By reason of these corrugations the walls will return to their original shapes when permitted to do so due to the change of external pressure.

As the walls of each cell move inwardly, they permit greater amounts of oil to enter the container. In other words, this action has the effect of increasing the cubical contents of the container. Conversely as the pressure in the container falls due to cooling of the oil in the cable, the walls of the cells will distend and force oil back into the cable.

From the foregoing it will be seen that the container means and the cellular means both contain fluids which differ in kind, one being oil and the other gas and further that one of said means receives fluid in varying amounts depending upon the temperature of the cable, while the fluid in the other remains constant in amount. By arranging the parts in the manner described, the walls of the cellular means are protected against injury both when expanded and contracted, due to changes of pressure conditions. By definitely positioning the cellular means so that each is held in a fixed position against bodily movement at its edges, as illustrated, each means will function independently of the others, according to the stiffness or characteristics of its walls until such time as they contact with adjacent walls, as distinguished from the type of construction wherein the movements of one part are added to those of another part to produce an enlarged movement in an axial direction.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. A variable capacity reservoir comprising a sealed container means, a plurality of individual cellular means located in the container means, each of which cellular means comprises a pair of thin metal disks united at their peripheral edges to define an internal chamber, said means being assembled flatwise to form a stack, means for holding the cellular means from side-wise movements in the container, said container means and cellular means both containing fluids which are separately maintained under pressure above the atmosphere, and a conduit for admitting fluid to and receiving it from one of said means in varying amounts.

2. A variable capacity reservoir comprising a sealed container means, a plurality of cellular means, each having a pair of flexible side walls, a ring means for each cellular means which forms a rim for the side walls and also a support for holding said means in fixed spaced relation, said ring means resting one on another, the container means and the cellular means both containing fluids which are separately maintained under pressure, and a conduit for admitting fluid to one of said means in varying amounts.

3. A variable capacity reservoir comprising an hermetically sealed container containing fluid subjected to variations of pressure, independent chambered cells within the container which are completely surrounded by the fluid within the container are arranged in a stack and contain fluid under pressure, the walls of the cells being corrugated and elastic to permit of movements due to the difference of pressure between the fluid within the chambers of the cells and that in the container, said walls being mutually supporting under certain pressure conditions, means for holding the cells in spaced stacked relation against bodily movement, and a conduit opening into the container through which fluid is admitted.

4. A variable capacity reservoir comprising an hermetically sealed container containing fluid under pressure, a plurality of stationary, independent chambered cells which have elastic walls and are submerged within the fluid in the container, and contain fluid under pressure, which fluid is separated from that in the container, annular means at the peripheries of the cells for holding them against bodily movements and with clearance spaces between them, a passage for fluid opening into said clearance spaces, and a conduit opening into the container through which fluid is admitted.

5. A variable capacity reservoir comprising an hermetically sealed container containing fluid subjected to variations of pressure, a plurality of stationary, hermetically sealed, fluid-containing metal cells having elastic walls, which cells are submerged within the fluid in the container, said cells being aligned to form a stack, the fluid in each cell tending to push the walls apart against the action of the fluid in the container, a means located at the peripheries of the cells for holding them in such stacked relation that the walls of adjacent cells mutually support each other when expanded to a predetermined extent, and a conduit which admits fluid to the container.

6. A variable capacity reservoir comprising an hermetically sealed container containing fluid, and a plurality of fixed, hermetically-sealed cells which are submerged in the fluid in the container, said cells each comprising a rim and a pair of flexible metal walls secured thereto and adapted to move outwardly and inwardly in response to changes of pressure of the fluid within the container, annular supporting means for the rims, said supporting means being so arranged one with respect to another and of such thickness, that the outward movements of the walls of one cell are limited by the corresponding movements of the walls of adjacent cells.

7. A variable capacity reservoir comprising an hermetically sealed container which is filled with fluid, a plurality of independent hermetically sealed cells which are submerged in the fluid, each cell containing an elastic fluid under a pressure above that of the atmosphere and having elastic walls adapted to move outwardly and inwardly in response to changes of pressure of the fluid within the container, means located at the peripheries of the cells which hold them in spaced stacked relation and prevent independent bodily movements, and a fluid-carrying conduit opening into the container.

8. A variable capacity reservoir comprising an hermetically sealed container which is filled with oil, a plurality of hermetically sealed cells which are submerged in the oil and adapted to move outwardly and inwardly in response to changes of pressure of the oil, each cell containing a fluid under pressure which is separately maintained from the oil, and means located at the ends of the container which limit the outward movements of the walls of the adjacent end cells, the movements of the walls of the remaining cells being limited by those of the adjacent cells.

9. A variable capacity reservoir comprising a thin-walled hermetically sealed container for oil, a plurality of individual and hermetically sealed, disk-like cells having thin metal walls, which are submerged in the oil, each of the cells containing a fixed and predetermined amount of fluid under pressure, the walls of said cells mutually supporting each other, and an outer casing which encloses and supports the container.

10. A variable capacity reservoir comprising an hermetically sealed container containing fluid, a plurality of cells which are located in the container and surrounded by the fluid therein, each cell comprising a pair of flexible metal walls, and a ring means which forms the rim for the cell and also a support, the ring means acting to hold the cells in fixed spaced relation at their edges.

11. A variable capacity reservoir comprising a sealed container means, a plurality of cellular means located in the container means, each of which has an annular rim and imperforate flexible side walls, means located at the peripheries of the cellular means for holding them in fixed spaced relation with clearances between the walls, the container means and the cellular means both containing fluids under pressure, which fluids differ in kind and are separately maintained, and a conduit through which fluid in varying amounts flows into and from one of said means.

12. A variable capacity reservoir comprising a sealed container, a plurality of cellular means arranged in a stack within the container, each of said means comprising a ring, and a pair of corrugated disks supported by the ring and defining between them a sealed chamber, the thickness of the rings being such that the walls of each cell can contact in the region of their centers when subjected to relatively high external pressure, and when subjected to relatively low external pressure can contact with those of adjacent cells to form a mutual support, and a conduit opening into the container through which liquid may flow into or out of the container.

In witness whereof, I have hereunto set my hand this 15th day of September, 1927.

LUIGI EMANUELI.